H. V. NYE.
MOTOR CONTROL SYSTEM.
APPLICATION FILED OCT. 4, 1911.
1,193,917. Patented Aug. 8, 1916.
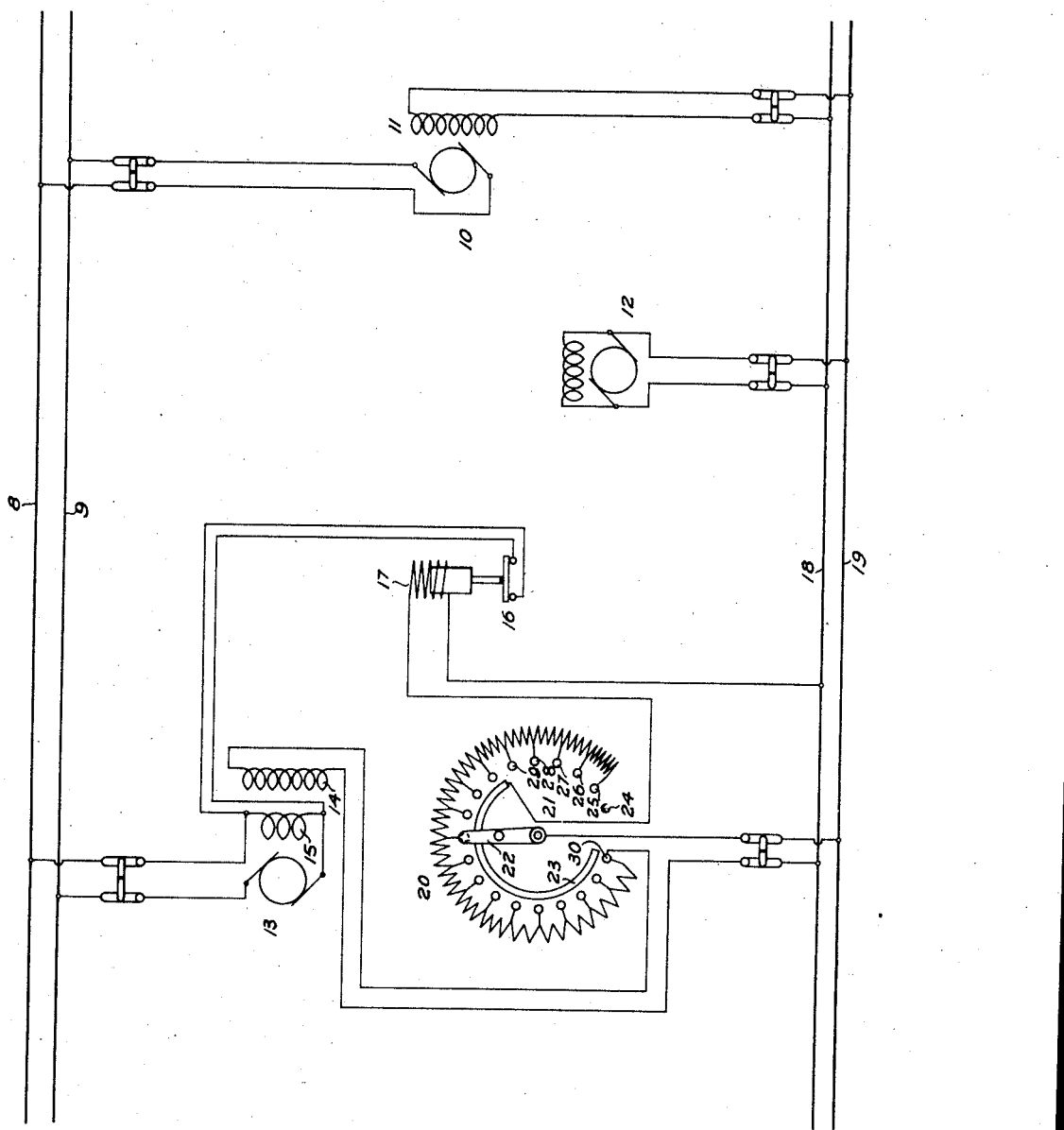

UNITED STATES PATENT OFFICE.

HENRY V. NYE, OF WEST ALLIS, WISCONSIN, ASSIGNOR, BY MESNE ASSIGNMENTS, TO ALLIS-CHALMERS MANUFACTURING COMPANY, A CORPORATION OF DELAWARE.

MOTOR-CONTROL SYSTEM.

1,193,917.      Specification of Letters Patent.      Patented Aug. 8, 1916.

Application filed October 4, 1911. Serial No. 652,815.

*To all whom it may concern:*

Be it known that I, HENRY V. NYE, a citizen of the United States, residing at West Allis, in the county of Milwaukee and State of Wisconsin, have invented certain new and useful Improvements in Motor-Control Systems, of which the following is a full, clear, and exact specification.

This invention relates to motor control systems.

In certain classes of work excessively wide speed variation with the maximum horsepower at maximum speed and with a corresponding torque at lower speeds, is required. Usually, for this class of work, a separately excited shunt wound direct current motor is used, which is driven directly by a separately excited direct current generator which is used only for driving said motor. The speed variation of the motor is then obtained by varying the field excitation of the generator. In the operation of certain classes of machinery, such as paper mill machinery, it is found that the variation in speed which is produced by a slight variation in the load is entirely too large when a generator having windings of the shunt type, whether separately excited or having a shunt connection to the machine, is used. To overcome this difficulty, generators having a compound winding have been used which render this variation produced by change in load very small. However, it is found that with a compound winding on the generator it is impossible to bring the speed of the motor down to desirable small values due to the effect of the series winding on the generator.

It is therefor an object of my invention to overcome the undesirable variation in motor speed which is produced by a slight variation in load when a separately excited generator of the type mentioned above is used, and to overcome the difficulty of obtaining low motor speeds when a compound generator is used to drive the motor. This object is accomplished by providing means whereby the series field winding of the driving compound generator can be cut into and out of the generator circuit at will, the other winding only being effective up to a certain predetermined speed, and the series winding being effective on the higher speed range to render practically a constant speed in spite of variations in load.

It is a further object of this invention to provide improved controlling apparatus for controlling the operation of electrical apparatus provided with a plurality of field exciting windings.

These and other objects are attained by my invention, the various novel features of which will be apparent from the description and drawing, and will be particularly set forth in the appended claims.

The single figure illustrates diagrammatically one system embodying my invention.

The system, which is here shown, includes a motor 10 the armature terminals of which are connected to mains 8 and 9, and its field 11 being separately excited by an exciter 12. The motor 10 is adapted to be driven by a generator 13 connected by mains 8 and 9, and having a separately excited field 14 also separately excited by the exciter 12. This generator is also provided with a series field winding 15 which, during a certain portion of the speed range, is short-circuited, rendering it ineffective. The cutting in and out of the series winding 15 is effected by the operation of an automatically operated switch 16 having a solenoid 17 connected across the mains 18 and 19 of the exciter 12. The energization and deënergization of the solenoid 17 is controlled by a generator field rheostat 20 which is adapted to vary the speed of the motor 10. This rheostat is provided with a plurality of sections of resistance terminating in contact buttons 21 which are adapted to be engaged by the rheostat handle 22 forming part of the field circuit of the generator. This rheostat is also provided with a contact segment 23 formed concentrically with respect to the contact buttons 21 and adapted to be engaged at certain predetermined times by the contact handle 22 of the rheostat. With this arrangement all of the advantages of obtaining a low motor speed with a shunt field generator and practically constant speed for variations in load on the motor by using a compound wound generator, are obtained.

The operation is as follows: When the handle 22 of the rheostat is on the contact button 24, the rheostat is in off position and the motor and generator are at rest. As the rheostat handle 22 is moved in a counter-clockwise direction from its initial position it passes over contact buttons 25 to 29 inclusive, gradually cutting sections of resistance out of the separately excited field circuit of the generator 13, causing the motor 10 to gradually take on increments of speed. Thus far during this movement of the rheostat handle 22 current has not passed through the series field 15 of the generator on account of the solenoid operated switch 16 being closed forming a shunt around said series field winding. During this range, motor speeds of very low value have been obtained by varying the resistance in the separately excited field circuit of the driving generator. When the rheostat handle 22 is moved farther in a counter-clockwise direction, it comes into engagement with the contact segment 23 establishing a circuit from one of the exciter mains 18, through solenoid 17 of the switch 16, contact segment 23, handle 22, to the other exciter main 19, energizing the solenoid 17 and causing switch 16 to open, cutting series field 15 into the generator circuit. From this point on as the rheostat handle is moved farther in a counter-clockwise direction and as long as the rheostat handle is in engagement with the contact segment 23 the generator has both the series and separately excited fields in circuit. With both of the generator field windings in circuit the speed of the motor remains practically constant even though there is a variation in the motor load. The rheostat handle 22 may be moved to its extreme counter-clockwise position, engaging contact 30, cutting out all of the rheostatic resistance in the generator separately excited field circuit, permitting the motor to run at its maximum speed. If it is desired to operate the motor at less speed than is possible with the generator acting as a compound machine, the rheostat handle may be turned in a clockwise direction, until the rheostat arm 22 has been turned out of engagement with the contact segment 23, whereupon the solenoid 17 is deënergized and the switch 16 closes, again short-circuiting the series winding 15 of the generator. The generator is now again operated as one having a separately excited field, and by continuing the movement of the rheostat arm in a clockwise direction more and more resistance is cut into said generator field circuit for decreasing the motor speed to any desired minimum value.

There may be various modifications and arrangements other than that here shown and specifically described, and I intend to cover all such modifications and arrangements which do not involve a departure from the spirit and scope of my invention as set forth in the appended claims.

What I claim as new is:

1. In combination, a motor, a generator having series and separately excited field windings and adapted to supply said motor with current, and means for varying the resistance of the circuit of said separately excited field and for cutting the entire series winding into or out of circuit during the period of variation of the resistance of said separately excited field circuit.

2. In combination, a motor, a generator having a plurality of field windings and adapted to supply said motor with current, a resistance in circuit with one of said windings, and means for varying said resistance and cutting the entire length of another of said windings into or out of the generator circuit during the period of variation of said resistance.

3. In combination, a motor, a generator having a plurality of windings and adapted to supply said motor with current, a resistance in circuit with one of said windings and a switch in circuit with another of said windings, and means for varying said resistance and for controlling the operation of said switch to cut the entire length of said other winding into or out of the generator circuit between the limits of variation of said resistance.

4. In combination, a motor, a generator having a plurality of field windings and adapted to supply current to said motor, a resistance in circuit with one of said field windings, and an automatically operated switch in circuit with another of said field windings, and means for varying said resistance and for operating said switch to cut said other field winding into or out of the generator circuit.

5. In combination, a motor, a generator having a separately excited field winding and a series field winding, said generator being adapted to supply said motor with current, a resistance in circuit with said separately excited field, and means for varying said resistance and cutting the entire series field winding into or out of the generator circuit while said generator is operating with portions of said resistance in circuit.

6. In combination, a motor, a generator having separately excited and series field windings and being adapted to supply said motor with current, and means for cutting the entire series field winding into or out of circuit only between the limits of variation of the current in said separately excited field winding.

7. In combination, a motor, a generator having separately excited and series field windings, an automatically operated switch in circuit with said series field winding, and means for operating said switch to cut said series field winding into or out of circuit as the current in said separately excited field winding is being varied.

8. In combination, a motor, a generator having series and separately excited field windings and adapted to supply said motor with current, an automatically operated switch in circuit with said series field winding, and a rheostat in circuit with said separately excited field winding and adapted to control the operation of said switch to cut said series field winding into or out of said generator circuit.

9. In combination, a motor, a generator having a plurality of field windings and adapted to supply said motor with current, and resistance varying means in circuit with one of said windings and being adapted to cut the entire amount of another of said field windings into or out of the generator circuit only while a portion of said first winding is effective.

10. In combination, a plurality of translating devices adapted to give and receive electrical energy, one of said translating devices having separately excited and series field windings, and means for varying the current in said separately excited field winding and cutting the entire series field winding into or out of circuit between the limits of current variation in said separately excited field winding.

11. In combination in a motor control system, a plurality of field windings, an automatically operated switch controlling the cutting in and out of one of said field windings, and a unitary controlling device for varying the current passing through one of said field windings and for controlling said switch.

12. In combination in a control system for electrical apparatus, a plurality of field windings, and a unitary controlling device therefor adapted to vary the current passing through one of said field windings and for rendering another of said field windings fully effective only while said first field winding is partially effective.

13. In combination, a generator having a plurality of field windings, and a controlling device therefor adapted to vary the current in one of said field windings and to render another of said field windings effective or ineffective between the limits of operating conditions of said generator.

14. In combination in a control system for electrical apparatus, a plurality of field windings, an automatically operated switch in the circuit of only one of said windings, and controlling means for varying the current in another of said windings and for causing the operation of said switch.

15. In combination, a plurality of translating devices adapted to give and receive electrical energy, one of said translating devices having a plurality of field windings, and means for varying the current in one of said field windings and for rendering another of said field windings fully effective or ineffective only while said first field winding is partially effective.

16. In combination, a motor, a generator provided with a plurality of field windings for driving the motor, means for varying the speed of the motor comprising a variable resistance in one of the field windings and means for rendering the second field winding effective or ineffective between the maximum and minimum degrees of excitation of the first winding.

17. In combination, a generator having a plurality of field windings, and means for regulating the output of the generator comprising means for gradually varying the excitation of one of the windings and for rendering the second winding effective or ineffective for purposes of excitation between the maximum and minimum degrees of excitation produced by the first winding.

18. In combination, a dynamo-electric machine having a plurality of field windings, and means for regulating said dynamo-electric machine comprising means for gradually varying the excitation due to one of said windings and for rendering the second winding fully effective or ineffective for purposes of excitation between the maximum and minimum degrees of excitation produced by the first winding.

19. In combination, a dynamo-electric machine having a plurality of field windings, and controlling means adapted to vary the current in one of said windings and to render another of said windings fully effective or ineffective between the limits of control that may be exercised through said first windings.

Milwaukee, Wis., Sept. 27, 1911.

In testimony whereof I affix my signature, in the presence of two witnesses.

HENRY V. NYE.

Witnesses:
CHAS. L. BYRON,
ROBERT E. STOLL.